UNITED STATES PATENT OFFICE.

EARL P. STEVENSON, OF CAMBRIDGE, MASSACHUSETTS, ASSIGNOR, BY MESNE ASSIGNMENTS, TO GENERAL BOND AND SHARE COMPANY, OF BOSTON, MASSACHUSETTS, A CORPORATION OF DELAWARE.

PROCESS FOR RECOVERING POTASH.

1,415,203. Specification of Letters Patent. Patented May 9, 1922.

No Drawing. Application filed August 7, 1919. Serial No. 315,875.

*To all whom it may concern:*

Be it known that I, EARL P. STEVENSON, a citizen of the United States, residing at Cambridge, in the county of Middlesex and State of Massachusetts, have invented certain Improvements in Processes for Recovering Potash, of which the following description is a specification.

Attempts have been made heretofore to recover potash from the saline deposits and the waters or brines of certain lakes found in the western part of this country. One of the most promising of these sources of potash in this country is Searles Lake, California. As yet, however, no process for the recovery of potash from these deposits has been devised, so far as I have been able to learn, capable of producing potash in a manner sufficiently economical to make it practicable under ordinary market conditions.

It is the chief object of the present invention to develop a practical process suitable for practise on a commercial scale for economically extracting potash from this and similar brines. It is proposed to utilize either the natural brine or a brine made by dissolving the saline deposits of one of these salt lakes or beds.

Searles Lake brine is essentially a solution containing the elements of sodium chloride, sodium sulphate, sodium carbonate, potassium chloride and borax. There are also present in traces other chemical elements which, however, need not be considered here. Of these chief ingredients the potassium chloride or muriate of potash is the most important commercially and is the material with which the present invention is concerned. Accordingly, the other salts, some of which, however, possess commercial value, may, so far as the present invention is concerned, be regarded as waste salts. The problem present, therefore, is to separate the potassium chloride from the remaining salts and from the water in which all of these salts are held in solution by a process sufficiently economical to make it practicable. Furthermore, since one of the most important commercial uses of potassium chloride is as a fertilizer, it is very desirable that this material be extracted or recovered in a relatively pure condition; and it is particularly desirable that it shall not contain any great percentage of either borax or sodium carbonate. That is, borax in excess of 1½% is, by some authorities, considered injurious to plant life, while any substantial percentage of sodium carbonate may be objectionable in some fertilizers.

Considering the possible mixtures of salts present in the brine, the simplest mixture from which the potassium chloride can be extracted is a mixture with sodium chloride. According to the present process, therefore, it is proposed first to treat the brine to substantially eliminate the waste salts other than sodium chloride and thus to leave in the brine essentially a mixture of potassium chloride and sodium chloride only. This mixture of salts is then treated to separate the potassium chloride.

For the purpose of disclosing the process somewhat more clearly than would otherwise be possible, it will be herein described in connection with the treatment of a specific sample of Searles Lake brine, although it will readily be appreciated that the composition of the brine may vary in different parts of the lake and under different conditions. The sample to be considered analyzes substantially as follows:

| | Per cent. |
|---|---|
| Sodium chloride, NaCl | 17.75 |
| Sodium sulphate, $Na_2SO_4$ | 4.46 |
| Sodium carbonate, $Na_2CO_3$ | 4.97 |
| Borax, $Na_2B_4O_7$ | 1.42 |
| Potassium chloride, KCL | 4.65 |

For the purpose of eliminating the waste salts the brine is first chilled sufficiently to precipitate the greater part of the sulphate, carbonate, and borate. The percentages of these substances that will be eliminated in this manner will vary with the degree to which the temperature of the brine is reduced, but this point will be determined not only by the elimination of waste salts but also, to some extent, by considerations of economy and the conditions under which the process is practised. Under most circumstances the most satisfactory temperature appears to be between —15° C. and —20° C. I find that after the sample of brine above referred to has been chilled to —15° C. and the precipitate filtered off, the remaining brine has a composition substantially as follows:

| | Per cent. |
|---|---|
| $Na_2SO_4$ | .61 |
| $Na_2B_4O_7$ | .81 |
| $Na_2CO_3$ | 1.55 |
| NaCl | 18.15 |
| KCL | 6.57 |

The potassium chloride does not separate as a solid at this temperature, nor even at a considerably lower temperature, although a very small percentage is lost due to occlusion by the precipitated salts. This chilling or refrigerating step also has the advantage of eliminating about 20% of the water as water of crystallization and thus reduces very substantially the quantity of liquid that must be handled in performing the subsequent steps of this process.

For the purpose of substantially completing the elimination of the borax, sodium carbonate and sodium sulphate left in the brine after the chilling step, the brine is next treated with some suitable precipitant for these materials, preferably calcium chloride. To facilitate the reaction the calcium chloride may be dissolved and the solution so formed added to the brine. When the precipitates resulting from this treatment have been filtered off, the filtrate has a composition substantially as follows:

| | Per cent. |
|---|---|
| Calcium salts of boric acid | .34 |
| Sodium chloride | 20.87 |
| Potassium chloride | 6.57 |

The brine is next evaporated to dryness, preferably by solar evaporation, thus producing a low grade potassium salt having substantially the composition:

| | Per cent. |
|---|---|
| Calcium salts of boric acid | 1.22 |
| Sodium chloride | 75.30 |
| Potassium chloride | 23.62 |

By evaporating the brine to dryness, which can readily be accomplished by solar evaporation, the difficult and expensive operations involved in separation of the salts by high temperature evaporation are eliminated from my process. There is a limited market for the low grade potassium salt, produced as above stated, and it is contemplated that for the purpose of supplying this market no further treatment of the salts will be necessary. For most purposes, however, a higher grade potash is required. It will be seen that this low grade salt is essentially a mixture of potassium chloride and sodium chloride and this mixture is treated to separate out the potassium chloride. I prefer to accomplish this result by extracting the mixture of salts with a saturated solution of sodium chloride at approximately 100° C. This may be done in a suitable apparatus by running the extraction liquor through the salts until the liquor is saturated with the potassium chloride. This saturated liquor is drawn off through a filter which removes any undissolved salts and is cooled to ordinary temperatures when nearly all of the potassium chloride will separate out due to the fact that the solubility of potassium chloride in such a solution decreases with a decrease in temperature while the solubility of sodium chloride increases. This potassium chloride crop is filtered off and the extraction liquor is used over and over again for extracting successive crops of potash. I consider it preferable to add a small quantity of calcium chloride to the extraction liquor to convert into calcium borates any borax that may still be present in the residual salts. It is obvious that as the extraction liquor is used in successive cycles it may become contaminated with substances other than those necessary for the extraction process but which will not, however, interfere with this process. While the potassium chloride separating from a concentrated solution of sodium chloride will occlude and adsorb some sodium chloride from the solution, still it is possible by this process to obtain a very high grade muriate of potash running even above 90% of potassium chloride.

It is obvious that instead of first chilling the brine and then treating it with a substance capable of precipitating the waste salts, the brine could first be treated with calcium chloride or other equivalent material. The precipitated salts could be filtered off and the filtrate then chilled to effect a further separation of the waste salts from the brine. This, however, is merely a reversal of the first two steps of this process as above described, and I prefer to first chill the brine for the reason that in the chilling operation so much of the waste salts and water are removed that a very much smaller quantity of the calcium chloride is required than would be necessary if these two steps were reversed.

Under some circumstances it may be desirable to evaporate the brine to dryness by solar evaporation immediately after the precipitates have been filtered out following the refrigerating step, and then to combine the step of extracting the potassium chloride with the step of precipitating the other waste salts by adding sufficient calcium chloride to the extraction liquor to accomplish this object. The precipitated salts are filtered out of the hot liquor and the liquor is then cooled to precipitate the potassium chloride.

While this process has been specifically described herein as applied to the recovery of potash from Searles Lake brine, it will readily be appreciated by those skilled in this art that the process is applicable to brines of the general nature of that found in Searles Lake whether they come from that particular lake or not, and whether the brine treated is the natural brine taken from the lake, or is brine made from the salt deposits of the lake. Consequently, it will be understood that the term "Searles Lake brine" as used in the appended claims identifies the type of brine to which the present method is applicable rather than brine necessarily taken directly from Searles Lake. It will also be understood that while the process has been herein described with reference to a particular sample of brine, that this procedure has been adopted for the purpose of clearly disclosing the process, and that the composition of the brine may vary considerably without affecting the applicability of the present process. In fact, the composition of the brine at different parts of the lake and under different conditions will vary but these variations do not affect the practise of the process herein described.

What is claimed as new is:

1. The process of extracting potash from Searles Lake brine which consists in chilling the brine sufficiently to precipitate a substantial part of the salts contained therein excepting sodium chloride and potassium chloride, and then separating the potassium chloride from the sodium chloride.

2. The process of extracting potash from Searles Lake brine which consists in substantially eliminating the waste salts from the brine except sodium chloride by chilling the brine and treating it with a substance capable of precipitating said waste salts, filtering off the precipitated salts and evaporating the filtrate to dryness.

3. The process of extracting potash from Searles Lake brine which consists in removing substantially all of the waste salts in the brine except sodium chloride by chilling the brine and treating it with a material capable of precipitating said waste salts, and then separating the potash from the sodium chloride.

4. The process of extracting potash from Searles Lake brine which consists in chilling the brine to remove a substantial percentage of the waste salts, treating the remaining brine with a substance capable of precipitating substantially all of the waste salts other than sodium chloride which have not been eliminated by the chilling operation and thus to leave the brine rich in sodium chloride and potassium chloride, filtering off the precipitates, evaporating the filtrate to dryness by solar evaporation, and then extracting the potassium chloride from the dry mixture of salts resulting from the evaporation process.

5. The process of recovering potash from Searles Lake brine which consists in reducing the temperature of the brine sufficiently to precipitate a substantial part of the waste salts, filtering the chilled brine to remove the precipitate, treating the filtrate with calcium chloride to effect a further precipitation of the waste salts, filtering out the precipitate, and evaporating the resulting filtrate to dryness.

6. The process of extracting potash from Searles Lake brine which consists in chilling the brine sufficiently to precipitate a substantial percentage of the waste salts, filtering off the separated salts, treating the filtrate with calcium chloride to effect a further precipitation of the waste salts not eliminated by the chilling and thus to produce a brine rich in sodium chloride and potassium chloride, filtering off the precipitate formed by the calcium chloride treatment, evaporating the filtrate to dryness, thus producing a mixture of dry salts consisting essentially of potassium chloride and sodium chloride and extracting this mixture for its potassium chloride content.

7. The process of extracting potash from Searles Lake brine which consists in chilling the brine sufficiently to precipitate a substantial percentage of the waste salts, filtering off the separated salts, treating the filtrate with calcium chloride to effect a further precipitation of the waste salts not eliminated by the chilling and thus to produce a brine rich in sodium chloride and potassium chloride, filtering off the precipitate formed by the calcium chloride treatment, evaporating the filtrate to dryness, thus producing a mixture of dry salts consisting essentially of potassium chloride and sodium chloride, treating this mixture of dry salts with a hot saturated solution of sodium chloride to dissolve the potassium chloride, filtering out the undissolved salts, cooling the filtrate to cause the potassium chloride to separate, and then filtering off the potassium chloride so separated.

8. The process of extracting potash from Searles Lake brine which consists in chilling the brine sufficiently to precipitate a substantial part of the salts contained therein excepting sodium chloride and potassium chloride, evaporating the brine to dryness, and extracting the dried mixture of salts for its potash content.

9. The process of extracting potash from Searles Lake brine which consists in chilling the brine sufficiently to precipitate a substantial percentage of the salts except sodium chloride and potassium chloride, evaporating the brine to dryness, and extracting the dried mixture of salts for its potassium chloride content with a solution containing a precipitant for the waste salts not eliminated by the chilling process.

10. The process of extracting potash from

Searles Lake brine which consists in chilling the brine to remove a substantial percentage of the waste salts, evaporating the brine to dryness, and treating the dried salts with a hot extraction liquor adapted to render the waste salts insoluble and to dissolve the potash content and cooling the extraction liquor to precipitate the potash salts.

11. The process of extracting potash from Searles Lake brine which consists in chilling the brine sufficiently to precipitate a substantial percentage of the salts except sodium chloride and potassium chloride, evaporating the brine to dryness, and extracting the dried mixture of salts for its potassium chloride content with a saturated solution of sodium chloride to which enough calcium chloride has been added to substantially eliminate the waste salts other than sodium chloride which still remain in the brine.

In testimony whereof I have signed my name to this specification.

EARL P. STEVENSON.